(12) United States Patent
Weber et al.

(10) Patent No.: US 7,016,865 B1
(45) Date of Patent: Mar. 21, 2006

(54) PERSONALIZATION FORMAT CONVERTER SYSTEM AND METHOD

(75) Inventors: Richard C. Weber, Stillwater, MN (US); Michael N. Sax, Shoreview, MN (US); Krishna Narayan, Gibsonia, PA (US); Fred H. Squires, Hugo, MN (US)

(73) Assignee: Deluxe Corporation, Shoreview, MN (US)

( * ) Notice: Subject to any disclaimer, the term of this patent is extended or adjusted under 35 U.S.C. 154(b) by 0 days.

(21) Appl. No.: 09/550,010

(22) Filed: Apr. 14, 2000

(51) Int. Cl.
*G06F 17/60* (2006.01)

(52) U.S. Cl. ...................................................... 705/26
(58) Field of Classification Search .................. 705/26, 705/27; 700/95, 96, 115
See application file for complete search history.

(56) References Cited

U.S. PATENT DOCUMENTS

| | | | |
|---|---|---|---|
| 4,799,156 A | 1/1989 | Shavit et al. .................. 705/26 |
| 4,887,207 A | 12/1989 | Natarajan ..................... 705/10 |
| 4,992,940 A | 2/1991 | Dworkin ...................... 705/26 |
| 5,029,099 A | 7/1991 | Goodman .................... 700/233 |
| 5,053,956 A | 10/1991 | Donald et al. ............... 713/601 |
| 5,099,422 A | 3/1992 | Foresman et al. ............. 705/1 |
| 5,111,392 A | 5/1992 | Malin .......................... 705/29 |
| 5,117,354 A * | 5/1992 | Long et al. ................... 705/27 |
| 5,168,445 A | 12/1992 | Kawashima et al. .......... 705/10 |
| 5,287,267 A | 2/1994 | Jayaraman et al. ........... 705/10 |
| 5,307,261 A | 4/1994 | Maki et al. ................... 705/29 |
| 5,311,424 A | 5/1994 | Mukherjee et al. ........... 705/29 |
| 5,339,252 A * | 8/1994 | White et al. .................. 700/98 |
| 5,347,306 A | 9/1994 | Nitta .......................... 348/14.1 |
| 5,357,439 A * | 10/1994 | Matsuzaki et al. ............ 700/96 |
| 5,440,479 A | 8/1995 | Hutton ......................... 705/26 |
| 5,450,317 A | 9/1995 | Lu et al. ........................ 705/10 |
| 5,459,656 A | 10/1995 | Fields et al. .................... 705/7 |
| 5,491,743 A | 2/1996 | Shiio et al. .................. 709/204 |
| 5,513,117 A | 4/1996 | Small .......................... 700/233 |
| 5,544,062 A | 8/1996 | Johnston, Jr. ................ 700/117 |
| 5,550,746 A | 8/1996 | Jacobs ......................... 700/231 |
| 5,552,994 A | 9/1996 | Cannon et al. ................ 700/95 |
| 5,557,780 A | 9/1996 | Edwards et al. .............. 703/27 |
| 5,579,231 A * | 11/1996 | Sudou et al. .................. 700/95 |
| 5,592,511 A | 1/1997 | Schoen et al. ............... 375/220 |
| 5,615,123 A | 3/1997 | Davidson et al. ........... 700/233 |

(Continued)

FOREIGN PATENT DOCUMENTS

WO    WO-99/35551 A2 * 7/1999

OTHER PUBLICATIONS

Anon., "MAXIS: 'SimCity' Company Releases New Gift Making Software; Innovative Gift Maker Lets Users Design and Order Presents Using PCs," Business Wire, Nov. 3, 1994.*

(Continued)

*Primary Examiner*—Nicholas D. Rosen
(74) *Attorney, Agent, or Firm*—Knobbe Martens Olson & Bear LLP

(57) ABSTRACT

A system and method for conveying information about a personalized product are disclosed. A web server processes product personalization information for a vendor. The web server accepts the personalization that a customer has provided and performed on a product. The web server further accepts a submission from the customer for an order for the production of that personalized product. The web server determines the vendors capable of producing the personalized product and may accept either customer selection of a vendor or automatic selection of a vendor to produce the personalized item. The web server can describe the personalized product in a manner consistent with a data specification or a production request format as defined by the vendor.

26 Claims, 7 Drawing Sheets

U.S. PATENT DOCUMENTS

| | | | |
|---|---|---|---|
| 5,625,776 A | 4/1997 | Johnson | 705/27 |
| 5,625,816 A | 4/1997 | Burdick et al. | 707/103 R |
| 5,664,111 A | 9/1997 | Nahan et al. | 705/27 |
| 5,701,423 A | 12/1997 | Crozier | 345/762 |
| 5,710,887 A * | 1/1998 | Chelliah et al. | 705/26 |
| 5,712,985 A | 1/1998 | Lee et al. | 705/7 |
| 5,717,597 A | 2/1998 | Kara | 705/408 |
| 5,758,328 A * | 5/1998 | Giovannoli | 705/26 |
| 5,784,568 A | 7/1998 | Needham | 709/234 |
| 5,784,635 A | 7/1998 | McCallum | 712/32 |
| 5,794,212 A | 8/1998 | Mistr, Jr. | 705/26 |
| 5,805,846 A | 9/1998 | Nakajima et al. | 345/753 |
| 5,825,651 A | 10/1998 | Gupta et al. | 700/103 |
| 5,828,839 A | 10/1998 | Moncreiff | 709/204 |
| 5,845,261 A | 12/1998 | McAbian | 705/26 |
| 5,859,972 A | 1/1999 | Subramaniam et al. | 709/203 |
| 5,864,827 A | 1/1999 | Wilson | 705/35 |
| 5,870,718 A | 2/1999 | Spector | 705/26 |
| 5,893,077 A | 4/1999 | Griffin | 705/34 |
| 5,895,454 A | 4/1999 | Harrington | 705/26 |
| 5,897,624 A | 4/1999 | Ramaswamy | 705/28 |
| 5,911,131 A | 6/1999 | Vig | 705/1 |
| 5,918,220 A | 6/1999 | Sansone et al. | 705/408 |
| 5,920,858 A | 7/1999 | Kitabayashi et al. | 707/4 |
| 5,930,768 A | 7/1999 | Hooban | 705/27 |
| 5,930,769 A | 7/1999 | Rose | 705/27 |
| 5,930,810 A | 7/1999 | Farros et al. | 715/506 |
| 5,960,405 A * | 9/1999 | Trefethan et al. | 705/9 |
| RE36,360 E | 10/1999 | Costanza | 705/8 |
| 5,983,203 A | 11/1999 | Church et al. | 705/35 |
| 5,983,263 A | 11/1999 | Rothrock et al. | 709/204 |
| 5,990,887 A | 11/1999 | Redpath et al. | 345/758 |
| 5,991,732 A | 11/1999 | Moslares | 705/8 |
| 5,991,770 A | 11/1999 | Zamora-McKelvy et al. | 707/200 |
| 5,993,048 A | 11/1999 | Banks et al. | 700/233 |
| 5,999,208 A | 12/1999 | McNerney et al. | 348/14.08 |
| 5,999,915 A | 12/1999 | Nahan et al. | 705/27 |
| 6,002,855 A | 12/1999 | Ladner et al. | 703/1 |
| 6,006,192 A | 12/1999 | Cheng et al. | 705/7 |
| 6,009,413 A | 12/1999 | Webber et al. | 705/26 |
| 6,016,478 A | 1/2000 | Zhang et al. | 705/9 |
| 6,021,396 A | 2/2000 | Ramaswamy et al. | 705/28 |
| 6,125,304 A * | 9/2000 | Suzuki | 700/182 |
| 6,167,382 A * | 12/2000 | Sparks et al. | 705/26 |
| 6,182,897 B1 * | 2/2001 | Knowles et al. | 235/462.01 |
| 6,199,115 B1 * | 3/2001 | DiRienzo | 709/236 |
| 6,282,550 B1 * | 8/2001 | Venkatesan et al. | 707/104.1 |
| 6,384,923 B1 * | 5/2002 | Lahey | 358/1.13 |
| 6,397,197 B1 * | 5/2002 | Gindlesperger | 705/37 |
| 6,493,677 B1 * | 12/2002 | von Rosen et al. | 705/27 |
| 6,560,499 B1 * | 5/2003 | Demmer | 700/97 |
| 6,609,108 B1 * | 8/2003 | Pulliam et al. | 705/27 |
| 6,668,205 B1 * | 12/2003 | Ueno | 700/96 |
| 6,669,832 B1 * | 12/2003 | Saito et al. | 705/26 |
| 6,853,980 B1 * | 2/2005 | Ying et al. | 705/27 |
| 2001/0032166 A1 * | 10/2001 | Ruffo et al. | 705/37 |
| 2002/0007294 A1 * | 1/2002 | Bradbury et al. | 705/7 |
| 2002/0033598 A1 * | 3/2002 | Beasley | 283/71 |
| 2002/0059243 A1 * | 5/2002 | Gillespie et al. | 707/10 |
| 2002/0065741 A1 * | 5/2002 | Baum | 705/26 |
| 2003/0195824 A1 * | 10/2003 | Duffy et al. | 705/26 |
| 2005/0102199 A1 * | 5/2005 | Lee | 705/27 |

OTHER PUBLICATIONS

Anon., "NETGROCER/AT&T: NetGrocer to Provide Online Grocery Shopping for AT&T Market Square," M2 Presswire, Oct. 29, 1997.*

Messmer, E., "New Breed of Electronic Commerce Offerings Ready to Hit the Market," Network World, vol. 14, No. 36, p. 10, Sep. 8, 1997.*

* cited by examiner

PERSONALIZATION FORMAT CONVERTER SYSTEM AND METHOD

RELATED APPLICATIONS

The present application is related to and incorporates by reference, in their entirety, the following commonly owned U.S. Patent Applications, both of which were filed on Apr. 14, 2000: U.S. patent application Ser. No. 09/550,354, entitled "Intelligent Personalization System and Method," and U.S. patent application Ser. No. 09/550,104, entitled "Online Artisan Community System and Method."

BACKGROUND OF THE INVENTION

1. Field of the Invention

The present invention relates generally to manufacturing and, in particular, to methods and systems for facilitating the manufacturing of personalized products by a vendor.

2. Description of the Related Art

Product customization is popular within many retail markets. Customers may add personalized features to a wide variety of products, including, but not limited to, greeting cards, T-shirts, hats, and golf balls. The personalization itself may take many forms, such as the product size, shape and color, and the location, size, shape and color of added text, graphics, images, audio or videos.

The personalization options presented to the customer are often quite limited. For example, a customer designing a personalized greeting card may be required to make a series of discrete text selections, each text selection coming from a limited number of prewritten choices. Or, if the customer is allowed to create his or her own text, it may be limited to a preset number of characters. Such limitations necessarily constrain the ability of customers to fully express themselves via the resulting personalized products.

Computer hardware and software developed for home use now provides a new source of text and graphics that may be incorporated into personalized products. Customers may use applications such as Adobe Illustrator™, Paint Shop Pro™, and Corel Photo-Paint™ to create digital images for this purpose. The images created with these applications, however, often possess different spatial resolution and include a different number of color capabilities than may be handled by the manufacturer of the personalized product. Furthermore, the size, shape, or format of the digital image may fail to correspond with the product to be personalized or the needs of the manufacturer. For a particular digital image or multimedia file, these limitations may preclude the vendor from producing a personalized product that utilizes that digital image or multimedia item, or at least result in a product that is unsatisfactory to the customer.

Similarly, word processors such as Microsoft Word™ and Corel WordPerfect™ provide users with hundreds or even thousands of different typestyles for text. Many of these fonts, however, may be incompatible with the needs of the manufacturers of the personalized product.

Additionally, each manufacturer or vendor of a product has its own job ticket format. This job ticket describes the job to be performed by the vendor. It includes such details as where an image is to be placed, what the image is, what text is to be placed, where the text is to be placed, what product is to be personalized, what color is the product, where is the product to be shipped, and to whom should the product be addressed. The personalized product can be expressed in multiple formats: images and text can be in multiple formats, describing where on a product an image or text is to be placed can be described in various ways. Thus, regardless of the format in which a customer presents its personalized product, that format should be converted to a format readable to a vendor for production of that personalized product to occur.

SUMMARY OF THE INVENTION

The preferred embodiment of the present invention discloses a system and method for processing a file for a vendor. The system comprises an acceptance module capable of accepting a first file, which is comprised of a product and a design. Also, the system comprises a content adaptation module, which is capable of converting the design from a format to a second format as defined by the vendor. The system also comprises a composition and assembly module, which is capable of representing the product and the design in a manner consistent with a data specification as defined by the vendor.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

These and other features and advantages of the invention will now be described with reference to the drawings of certain preferred embodiments, which are intended to illustrate and not to limit the invention, and in which.

DETAILED DESCRIPTION OF THE PREFERRED EMBODIMENT

Figure 1:
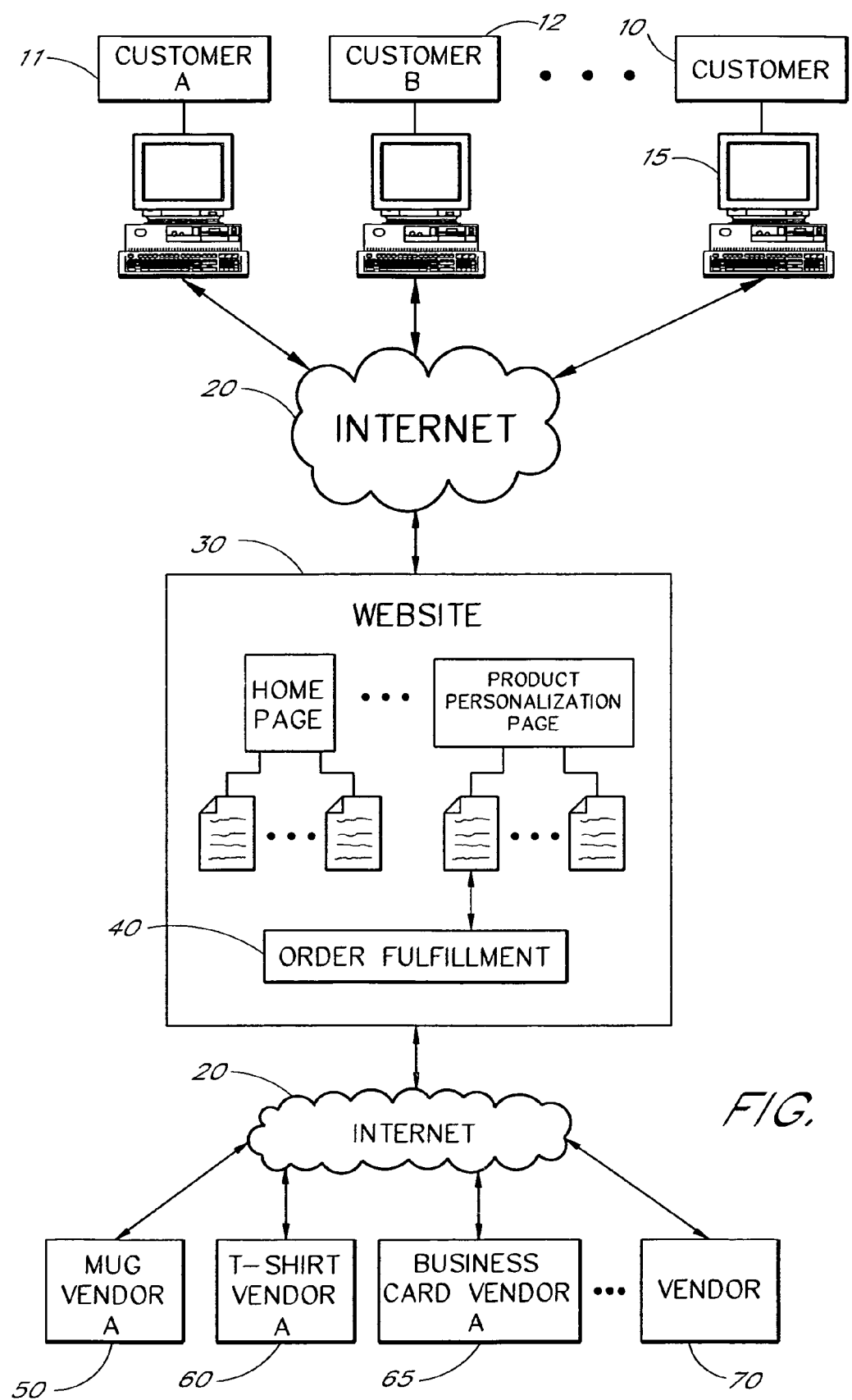
FIG. 1 is a component diagram depicting the communication architecture and functional operation of the system.

The system will now be described with reference to the drawings. These details are set forth in order to illustrate, and not to limit, the invention. The scope of the invention is defined only by the appended claims.

Network Community

The present invention permits communication between a customer and a product personalization software and a community of vendors, across a computer network, such as the Internet, as generally understood in the art. As used herein, "Internet" refers to a network or combination of networks spanning any geographical area, such as a local area network, wide area network, regional network, national network, and/or global network. As used herein, "Internet" may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

The system preferably includes a website wherein customers and vendors can make use of the features of the present invention, as described herein. As used herein, the term "website" refers to one or more interrelated web page files and other files and programs on one or more web servers, the files and programs being accessible over a computer network, such as the Internet, by sending a hypertext transfer protocol (http) request specifying a uniform resource locator (URL) that identifies the location of one of said web page files, wherein the files and programs are owned, managed or authorized by a single business entity. Such files and programs can include, for example, hypertext markup language (HTML) files, common gateway interface (CGI) files, and Java applications. The web page files preferably include a home page file that corresponds to a home page of the website. The home page can serve as a gateway or access point to the remaining files and programs contained within the website. In one embodiment, all of the files and programs are located under, and accessible within, the same network domain as the home page file. Alternatively, the files and programs can be located and accessible through several different network domains.

The system also includes a plurality of web pages, such as the above-mentioned home page. As used herein, a "web page" comprises that which is presented by a standard web browser in response to an http request specifying the URL by which the web page file is identified. A web page can include, for example, text, graphics, animation, and sound. As used herein, with reference to a particular website, an "internal web page" refers to a web page that is part of that website. Thus, an internal web page is a web page that is owned, managed, or authorized by the same entity that owns or manages the website. An internal web page can be located either within or outside of the same network domain or path as the home page file of the website.

As used herein, a "customer" refers to a person that uses the website of the present invention for the purposes of shopping for or purchasing personalized products or production services. The words "customer," "user" and "visitor" are used interchangeably herein. An "artist" is a person that uses the website of the present invention to display, sell, or offer to sell artwork and/or art production services. The words "artist" and "artisan" are used interchangeably herein. The word "vendor" refers to a manufacturer or producer of products. The word "format" refers to the specific form in which something, for example, data is arranged. The word "interface" refers to any processing means, software or method.

Now referring to FIG. 1, a computer, including the user computers 15, vendor computers, and the computers comprising the web server, may be any microprocessor or processor controlled device that permits access to the Internet 20, including terminal devices, such as personal computers, workstations, servers, clients, mini computers, mainframe computers, laptop computers, a network of individual computers, mobile computers, palm-top computers, hand-held computers, set top boxes for a TV, interactive televisions, interactive kiosks, personal digital assistants, interactive wireless communications devices, mobile browsers, or a combination thereof. The computers may further possess input devices such as a keyboard, mouse, touchpad, joystick, pen-input-pad, and output devices such as a computer screen and a speaker.

These computers may be uni-processor or multi-processor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such a network interface card, a modem, or other network connection device suitable for connecting to the communication medium (in this case, the internet 20). Furthermore, the computers execute an appropriate operating system such as Linux, Unix, Microsoft® Windows® 95, Microsoft® Windows® 98, Microsoft® Windows® NT, Apple® MacOS®, or IBM® OS/2®. As is conventional, the appropriate operating system includes a communications protocol implementation which handles all incoming and outgoing message traffic passed over the Internet 20. In other embodiments, while the operating system may differ depending on the type of computer, the operating system will continue to provide the appropriate communications protocols necessary to establish communication links with the Internet 20.

The computers may advantageously contain program logic, or other substrate configuration representing data and instructions, which cause the computer to operate in a specific and predefined manner as described herein. In one embodiment, the program logic may advantageously be implemented as one or more object frameworks. These modules may advantageously be configured to reside on the addressable storage medium and configured to execute on one or more processors. The modules include, but are not limited to, software or hardware components which perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The depicted components in FIG. 1 and in later figures may advantageously communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may advantageously be implemented to execute on one or more computers. In another embodiment, some of the components, modules, and databases may be implemented to execute on one or more computers external to the website 30. In this instance, the website 30 includes program logic, which enables the website 30 to communicate with the externally implemented components, modules, and databases to perform the functions as disclosed herein.

Product Personalization and Ordering

FIG. 1 illustrates the components of the system. A number of customers 10 access the internet 20 and subsequently, a website 30, via computers 15. For example, customer A 11 and customer B 12 access a website 30 via the internet 20 and computers 15. A number of vendors 70 access the internet 20 and subsequently, a website 30 via computers (not shown). The vendors 70 may include a plurality of vendors of different products. For example, the vendors 70 may include mug vendor A 50, t-shirt vendor A 60, business card vendor A 65 and other vendors.

The website 30 consists of multiple pages including, but not limited to, text, multimedia, software and links. The website 30 depicted in FIG. 1 is designed to accommodate visitors desiring to purchase products personalized for their purposes. As such, the website 30 provides a product personalization page which provides an interface providing visitors with the ability to browse and search within a wide variety of products for the purpose of selecting and personalizing a product to purchase. The website 30 provides an interface to communicate the order for a personalized product to a vendor 70. The system can be implemented by an on-line server or by an off-line processor. For example, the web site 30 can include a web server application ("web server") that processes customer interaction received from customer computers 15 via the Internet 20. All information, data and databases can be stored on a computer storage device such as hard drives.

The website 30 further provides visitors with the browsing and searching capabilities within a wide variety of images and text for incorporation within the product selected for personalization. The website 30 additionally provides visitors with a product personalization page which provides an interface which accepts personalization by the customer of a wide variety of features (e.g., the typestyle, location, and color of added text) for the product selected. The interface provided by the web server accepts the selection by the customer of features or any communication of data via well-known web-based techniques such as hypertext links, popup or pulldown menus, entry fields, Java applets and the like. In this application, the term "image" is used for ease of description and encompasses any design component storable in digital form that may be incorporated into a personalized product. This includes, but is not limited to, two- and three-dimensional representations, audio, video, animation, and the like. Images may be incorporated onto products in many different ways depending upon the nature of the image and the nature of the product. Two-dimensional pictorial images may be incorporated onto a paper product (e.g., a business card) using ink, onto a glass or metal product using, for example, etching, onto a wood product using ink, paint, carving, etc., onto a T-shirt using silk-screening, sewing, and so on. Audio enhancements may be incorporated onto alarm clocks (e.g., personalized wake-up messages), onto greeting cards (e.g., a birthday medley), on to cuckoo clocks, and so on. The manner of incorporation is limited only by the manufacturing capabilities of the vendors, which produce the personalized product.

At the web page, the website 30 provides an interface accepting the customer's 10 personalized data, including, but not limited to, pictures, images, audio files, multimedia items, on a variety of products, including but not limited to, mugs, t-shirts, apparel, office supplies, housewares, home accents, gifts, outdoor, pets, electronics, entertainment, checks, cards, invitations, audio/visual/multimedia products, in order to personalize them. At the web page, the website 30 provides an interface which receives a customer's 10 personalized product request (a personalized product order). A detailed description of the personalization system and process is described in co-pending application "Intelligent Personalization System and Method," filed concurrently with the present application and identified above. Additionally, the customer 10 can commission an artist to create a personalized piece of artwork, for personal use or for use on a product to be personalized. A system and method of artisan commissioning is described in co-pending application "Online Artisan Community System and Method," filed concurrently with the present application and identified above.

At the website 30, a web server provides an interface which accepts a selection by a customer 10 of a product from a list of different products. Next, a web server provides an interface which accepts a selection by a customer 10 of the size and color or any other attribute of the product he or she has chosen. In one embodiment, the interface includes a dropdown menu from which the customer may select one of several options. After selecting a product the website 30, the interface informs the customer 10 of all the personalization design constraints that the chosen product has, including, but not limited to: (1) areas of the product that can be personalized; (2) image colors that can be produced; (3) image sizing constraints; (4) image quality issues; (5) areas where text can be produced; (6) fonts and font sizes that can be used; (7) embedded audio and video issues; (8) physical product types (including, but not limited to, metal, ceramic, cloth and wood). For example, the image sizes, positions, and orientations available to the customer within this interface is constrained by the nature of the product being personalized. For example, T-shirt vendors may limit images to the to the front, back, sleeve, pocket, etc. Some vendors may allow the incorporation of images oriented vertically, at 45-degree angles, and so on.

Design constraints, along with the product description (type, size, color) define the product. T-shirts, for example, may be purchased from some vendors only in the sizes extra-large (XL), large (L), medium (M), small (S), and extra-small (XS). This definition can take an electronic form called the product design definition. The product design definition can be different for each product type. For example, a business card can be defined by its product type, dimensions, stock of paper, color, areas in which text can be placed, the types of text that can be produced on the business card, areas in which images can be placed, and the types of images that can be placed on the business card. For example, a business card could be described in the following format: orientation="portrait" (or landscape); side="frontside" (or backside); product="business card"; size=3.5 in.×2 in.; stock=50 bond; color=white; font=(Courier or Arial or Times New Roman); text placement=left half of card; image format=(JPG or BMP); image placement=right half of card. A unique electronic business card design definition can also represent this unique product design definition in such file languages including, but not limited to, XML (eXtensible Markup Language), an assembly list, EPS (Encapsulated PostScript), PPF, or Java, as is well known in the art. For example, business card may be represented by a serial number; the dimensions by a three dimensional vector; paper stock by a number; fonts by a alphanumerics; area for text as a vector description; images as alphanumerics; and area for image by a vector description. Furthermore, certain products are only available in sets. Golf balls, for example, may be purchased from some vendors only in sets of twelve. Such information may be incorporated into the product design definition. Thus, each type of product that a customer can select to be personalized can have a unique product design definition in electronic form.

The interface provided by the web server accepts a personalization of the chosen product by a customer 10, which was done on a product personalization web page 35. The personalization of a chosen product may be accomplished with personalization software integrated with the interface. The software presents a graphical representation of the product on the computer screen for the customer 10 to view. Then, the interface provided by the web server accepts an uploaded, downloaded or otherwise accessed image which has been selected by the customer 10. The interface provided by the web server accepts any sizing and manipulation done to the image on the chosen product by the customer 10. Additionally, the interface provided by the web server accepts text and any text placement, sizing or other manipulation for the product and inputted by the customer 10. All of this occurs on the computer screen by use of the computer 15. Since, the interface provided by the web server, accepts customer placement of any type of content with any type of format, the interface eases the personalization process, because there is no constraint on the format of the content used to personalize the product. After the product is personalized, the interface gives the customer 10 an opportunity to validate the final product in a "what you see is what you get" (WYSIWYG) manner. If satisfied, the interface provided by the web server accepts the submission by the customer 10 for an order for that personalized product. The web server provides an interface which accepts a customer 10 submission for the order for a personalized product in another linked internal web page or on the product personalization web page, the page where the product personalization occurred. In either case, the interface or internal web page can accept the submitted order for that personalized product, which results in the creation of a personalized product file 90 which describes the product and the personalization of that product. In either case, the order fulfillment system 40 may also communicate the order to a plurality of vendors 70 for bidding on the personalized product job or to a single vendor. Additionally, within each product type, the interface may be able to communicate to a plurality of vendors of a single product type.

Order Fulfillment

Figure 2:
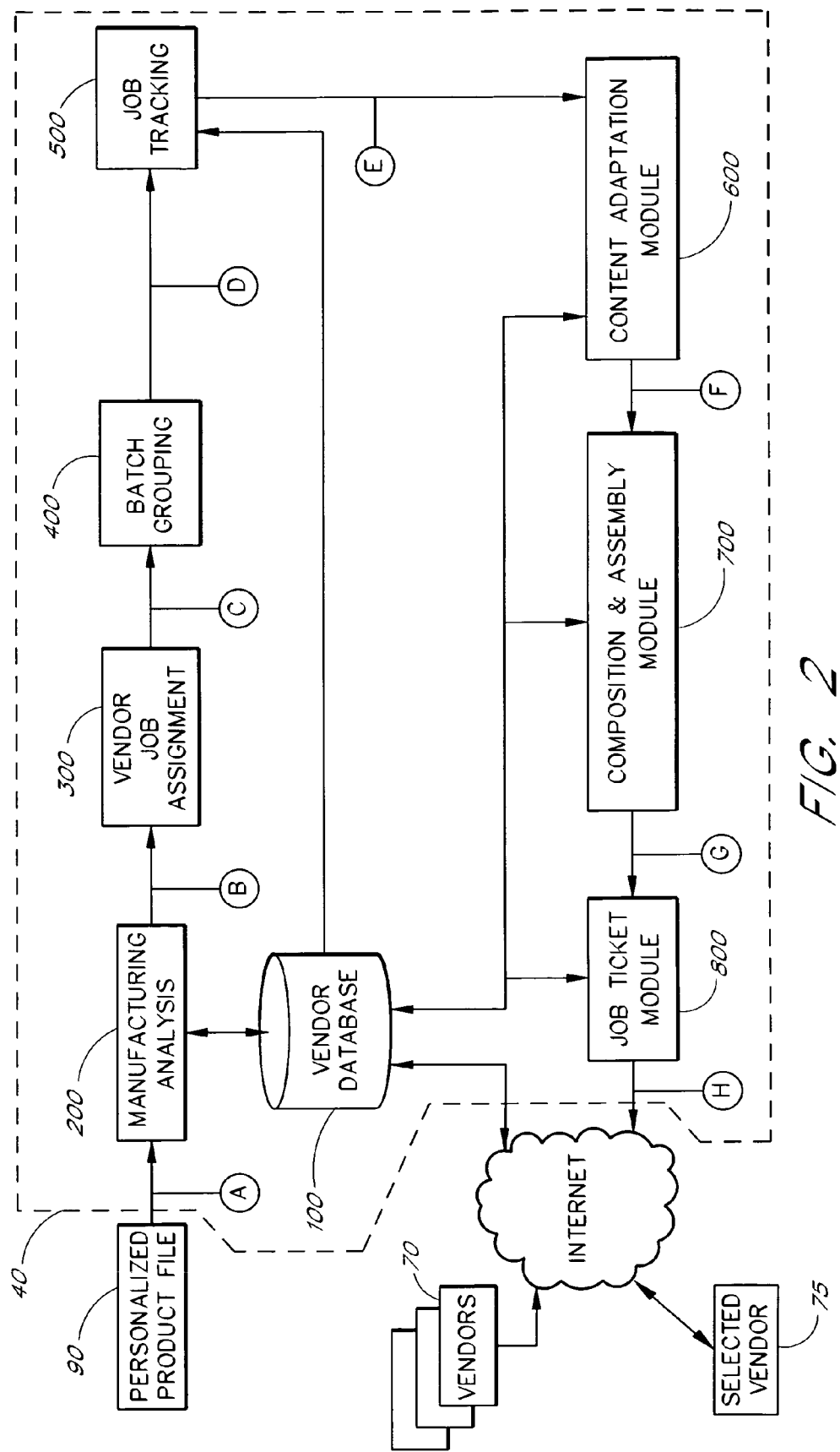
FIG. 2 shows a block diagram illustrating a process or method of converting a personalized product order into a vendor job ticket.

In FIG. 2 at point A, a personalized product file 90 is an input to the order fulfillment system 40. The order fulfillment system 40 is comprised of the following modules: manufacturing analysis 200, vendor job assignment 300, grouping 400, job tracking 500, content adaptation module 600, composition & assembly module 700, and the job ticket module 800. Additionally, a vendor database 100 interacts with the manufacturing analysis module 200, the content adaptation module 600, the composition and assembly module 700, the job ticket module 800, and vendors 70. The output of the order fulfillment system 40 is communicated to a vendor 70. One way an order can be communicated to a vendor is in the form of a job ticket and personalized content file. Collectively, the content adaptation module 600, the composition and assembly module 700, and the job ticket module 800 create a production request in a format which is compatible with the requirements of a vendor.

Generally, the manufacturing analysis module 200 determines which vendors are capable of producing the personalized product; the vendor job assignment module 300 determines which vendor is chosen to produce the personalized product; the batch grouping module 400 groups similar personalized product jobs together to be produced by the same vendor; the job tracking module 500 tracks of the personalized product order and production; the content adaptation module 600 converts the format of the customer chosen content into one that the selected vendor can accept; the composition and assembly module 700 performs the composition and assembly requirements to define the personalized product in the manner in which a vendor defines a personalized product; the job ticket module creates a production request for the personalized product order in a format the vendor can read.

The order fulfillment system 40 can be implemented in software or hardware on a web server or on an off-line processor. Additionally, each module or component within the order fulfillment system may be implemented in software or hardware on a web server or on an off-line processor. Moreover, each module can be combined with other modules or broken down into several smaller modules. For example, the composition and assembly module 700 and the content adaptation module 600 can be integrated into one module without departing from the system.

In particular, the manufacturing analysis module 200 reviews the personalized product file 90 and the vendor database 100 to determine all the vendors capable of making the personalized product. The vendor database 100 contains information regarding all vendors 70 affiliated with the website 30, including, but not limited to, production capabilities. The manufacturing analysis module 200 then communicates the personalized product file 90 and the information regarding the vendors capable of making the personalized product to the vendor job assignment module 300. The vendor job assignment module 300 uses the personalized product file 90 and the information regarding the vendors capable of making the personalized product to select a vendor 75 to produce the personalized product. The vendor job assignment module 300 communicates the personalized product file 90 and the information regarding the chosen vendor 75 to the batch grouping module 400. The batch grouping module 400 can group together similar personalized product jobs for the same vendor, and then communicate that information to the job tracking module 500. The job tracking module 500 gives the personalized product file and subsequently the personalized product job an electronic identification, which can be monitored throughout the personalized product production. The job tracking module 500 can determine the proper electronic identification for a personalized product for the selected vendor 75 from the vendor database 100. The job tracking module 500 then communicates personalized product file 90, electronic identification, and the information regarding the chosen vendor 75 to the content adaptation module 600. The content adaptation module 600 utilizes the information regarding the chosen vendor and that chosen vendor's accepted formats from the vendor database 100 to format the personalized content, which was used to personalize a product, into the format accepted by the selected vendor 75. This process converts the personalized product file 90 into a new file, the content corrected personalized product file 91. If the format of the personalized content is acceptable to the selected vendor, no formatting may need to be done. The content adaptation module 600 then communicates the content converted personalized product file 91 to the composition and assembly module 700. The composition and assembly module 700 utilizes the information regarding the selected vendor's 75 accepted specifications from the vendor database to convert the content corrected personalized product file 91 into a vendor specific personalized file 92, which expresses the personalized product in a manner consistent with the data specification as defined by the selected vendor. The composition and assembly module 700 communicates the vendor specific personalized file 92 to the job ticket module 800. The job ticket module 800 utilizes information from the vendor database to determine the selected vendor's 75 production request format. The job ticket module 800 then converts vendor specific personalized file 92 into a production request, such as a personalized product job ticket 95. The job ticket module 800 then can communicate the personalized product production request to the selected vendor 75.

The communicating of the various personalized product files 90, 91, 92 and 95 can either be accomplished by having the web server transfer the file from module to module or by having each module access the personalized product files 90, 91, 92 and 95 from a personalized product database (not shown).

As an input, the web server accepts from a customer an order for a personalized product, which subsequently creates an electronic personalized product file 90, which not only defines the product to be personalized, but also the personalization that has been done (e.g., the personalized content). The personalized product file 90 can be written in XML or Java or any other such format as is well known in the art. For example, one way to describe the personalized product is to list the following: type of product, dimensions, stock of paper, color, the text which was placed, the area in which text was placed, the font of the text, the image which was placed, the area in which the image was placed, the format of the image.

When a customer personalizes a product, he or she can use formats for the personalized content, including, but not limited to:

Image Formats—JPEG (Joint Photographic Experts Group), EPS (Encapsulated PostScript), TIFF (Tagged Image File Format, also TIF), BMP (Microsoft Bit-MaP), GIF (Graphics Interchange Format), PNG (Portable Networks Graphics), PDF (Portable Document Format), SVG (Scalable Vector Graphics), IMG (HTML format), TGA (TrueVision Targa)

Video Formats—AVI (Audio Video Interleave), MOV (Quicktime), MPEG (Moving Picture Experts Group), VIV (VivoActive)

Audio Formats—MP3 (MPEG, audio layer 3), Wav (Windows), AU (audio open format), Aiff (Audio Interchange File Format), Voc (voice open format), Mp2 (MPEG)

Font Formats—Times New Roman, Courier, Arial

For example, assume Customer A 11 wants to customize a business card. The web server provides an interface which accepts the selection by Customer A 11 of the type of business card she wants to customize from a list of different business cards. Then, the interface displays to Customer A 11 scaled or to scale business card on the computer screen. Also, the web server provides an interface which accepts an image selected by Customer A 11 though uploading or downloading or selection from a gallery of images and further accepts the placement of that image on the business card by Customer A 11. Similarly, a web server provides an interface which accepts text either typed by or selected by Customer A 11. The interface provided by the web server accepts the manipulation of the text through sizing, placement, or other manipulation, of the business card by Customer A 11. The web server provides an interface which accepts any manipulation by Customer A 11 done to the various images and text that has been placed on the business card to his own satisfaction. The limitations placed upon the placement of the images and text are already known to the software and it informs Customer A 11 that an operation is not possible. Once Customer A 11 is satisfied with the personalization, the web server provides an interface which accepts an order submitted by Customer A 11. As a result, the interface provided by the web server creates and accepts an electronic personalized product file 90. For a personalized business card, the personalized product file 90 could contain the following information: business card identifier, 3.5 in.×2 in., 50 bond, white, TEXT, left side of card, Courier, IMAGE, right side of card, JPG. Additionally, a customers name, billing address, shipping address and quantity of order can be stored in this file.

Alternatively, an Oracle database or table can be used to store the personalized product file 90, as is well known in the art.

The order fulfillment 40 system and process communicates the personalized product orders to vendors. One manner in which order fulfillment can be completed is by the website 30 communicating to a selected vendor 75 through the internet 20. This communication will relay all the information describing the personalized product. Then, a selected vendor 75 can produce the personalized product.

The order fulfillment system 40 and process communicates a personalized product request to the proper vendor in a form readable to the vendor. As discussed above, multiple vendors will create personalized versions of a wide variety of products including, but not limited to, t-shirts, mugs, pencils, baseball bats, and other multimedia products. Each vendor may require a different format and composition for a personalized product job based on their specific production technique, equipment availability, product requirements, and other vendor specifications.

FIG. 2 illustrates a process and system by which order fulfillment 40 is achieved. One way in which order fulfillment is achieved is by converting a personalized product order into a production request for a vendor to read. As used herein, the term "convert" is used in a broad sense to denote any manipulation, formatting, alteration, modifying, processing or treatment of data. As mentioned above, once an order for a personalized product is made a personalized product file 90 is created by the web server that contains all the information necessary for that personalized product to be described and made. For example, this personalized product file 90 may contain, the customer's name, shipping address, the quantity of the order, the product to be personalized, the design definition of the product to be personalized, the image to be placed on the product, the area in which the image is to be place, the text to be placed on the product, the area in which the text is to be placed, the font of the text.

This file may contain other information including, but not limited to, the resolution of the image.

A dynamic listing of all vendors and their information informs the various modules of information needed by those modules in the process to create a production request. One way to do this is to have a vendor database 100 retain all this information.

Vendor Database

Figure 3:
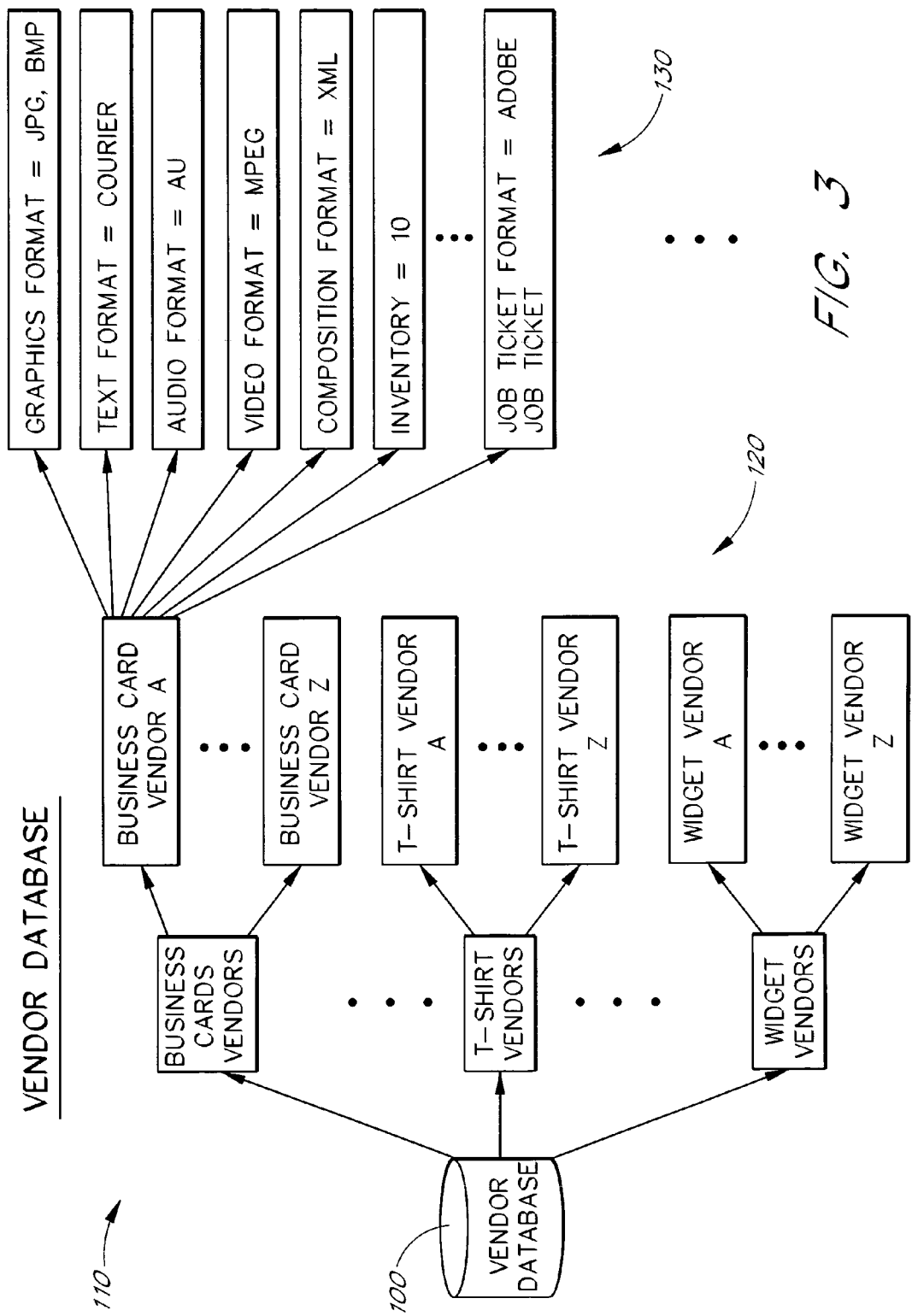
FIG. 3 is a system component diagram depicting the vendor database of FIG. 2.

Now referring to FIG. 3, order fulfillment 40 includes a vendor database 100 illustrated in a component diagram. The vendor database 100 is comprised of all the information regarding all vendors associated with the website 30. Additionally, the vendor database 100 is dynamic; a vendor 70 can update its file on the database at any time. The vendor database 100 is first subdivided into product specific vendor categories 110, which is made up of all the products available to be personalized by a customer 10. For example, the product specific vendor categories 110 could be mug vendors, t-shirt vendors, business card vendors, and so on. The vendor database 100 is next further divided into specific vendor listings 120 for a product. For example, all individual mug vendors, such as mug vendor A, will be listed under the mug vendors category. Likewise, t-shirt vendor A, t-shirt B and all other t-shirt vendors will be listed under the t-shirt vendor category. At the final level of the vendor database 100, all the pertinent information regarding a specific vendor is listed. For example, this information can include the acceptable graphics formats, acceptable font formats, acceptable audio formats, acceptable video formats, acceptable composition formats, acceptable production request formats, the current inventory of the vendor, the current turnaround time of the vendor, the current quality rating of the vendor, and the current pricings the vendor is offering. Other information pertinent to producing a personalized product may also be included in this level.

The vendor database 100 can be initially created manually by interviewing manufacturers by obtaining all the capabilities and requirements of the vendor and then inputting them into a vendor database 100 kept on a computer or a storage device. Alternatively, the vendors could enter the data into the vendor database 100 themselves. Also, the vendor database 100 could query a database kept by the vendor that keeps all the pertinent information and accurate the vendor database in that manner. Further, a vendor can update the vendor database 100 with new data regarding any of that vendor's specifications.

Manufacturing Analysis

As shown in FIG. 2, the order fulfillment 40 system includes a manufacturing analysis module 200, which determines the vendors capable of producing the personalized product. The interface gives an opportunity to the customer 10 to validate his or her personalized product and an opportunity to click on the summit order button in the browser. If the customer does submit an order, the interface can accept the personalized product order. At this point, point A, it is assumed that all order requirements have been captured and have been approved by the customer, and that the order and any customer supplied content is producible. The manufacturing analysis 200 ultimately determines which vendors can complete the personalized product order. One way to do this is to analyze the following: (1) which vendors can produce the item; (2) which of these vendors have the capacity to produce the item; and (3) which vendor should be assigned the personalization product job.

Figure 4:
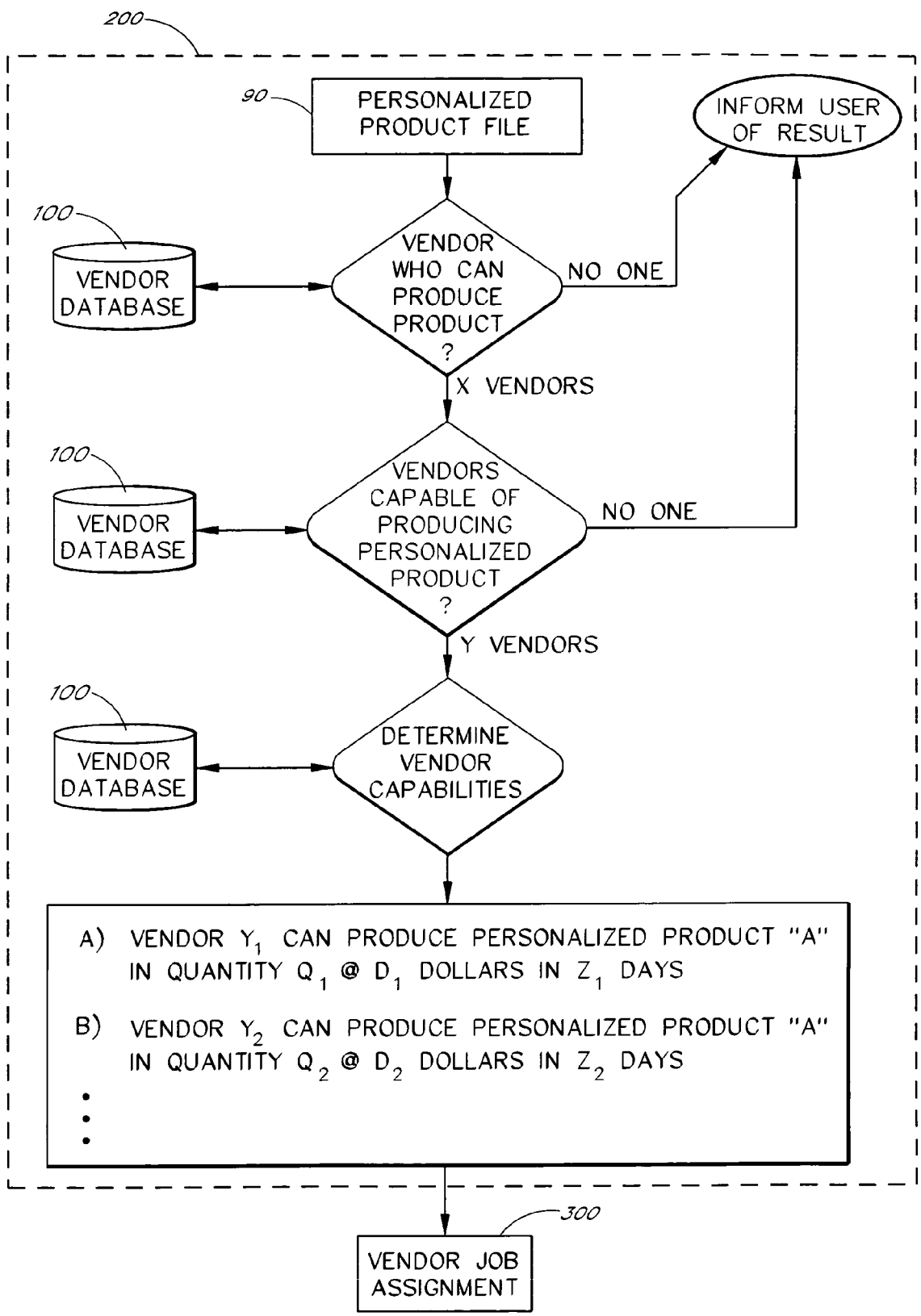
FIG. 4 shows a diagram illustrating a system and method of vendor selection for a personalized product job.

As shown in FIG. 4, one method of vendor selection for determining vendors capable of producing a personalized product order is illustrated in a diagram. The manufacturing analysis 200 extracts the product design definition from the personalization product file 90 to determine which product is being ordered. Next, the manufacturing analysis 200 searches the vendor database 100 for the product specific vendor category 110 that matches the product design definition or product choice. This will result in "X" vendors who can produce the personalized product. Next, the manufacturing analysis module 200 compares the personalized product file 90 to determine which of the "X" vendors are capable of producing the personalized product in terms of: (1) having the production techniques to produce the personalized product; (2) having the capacity (inventory and time) to produce the personalized product; and (3) having the service requirements to produce the personalized product. The list of "X" vendors who meet such requirements results in a subset of "Y" vendors. If no one is capable of producing the personalized product, then the user or customer is informed of this result. Then, the vendor database 100 is queried by the manufacturing analysis module 200 to determine the capabilities of each of the "Y" vendors. This request results in the vendor database 100 outputting the capabilities, including, but not limited to, the quantity, price and turnaround time for a personalized product.

For example, if customer A 11 has submitted an order for a personalized business card with an image and some text, the manufacturing analysis module 200 first locates all the business card vendor in category 110 in the vendor database 100. Next, the manufacturing analysis module 200 lists all the business card specific vendors 120 in the vendor database 100. Then, the manufacturing analysis module 200 determines which vendors in this business card subset of all vendors, have the capability to place an image and text on a business car—these will be the "Y" business card vendors. Some business card vendors may only be able to place black and white images on business cards whereas others may not be able to place any image on the business card at all. Therefore, the manufacturing analysis module 200 will determine which business card vendors (in other words, which "Y" business card vendors) have the capabilities to personalize the product in the way the customer has chosen to personalize.

At this point, point B on FIG. 2, the personalized product file 90 is supplemented with additional data including the list of vendors capable of producing the personalized item, and their capabilities. Alternatively, the personalized product database can be supplemented with additional data including the list of vendors capable of producing the personalized item, and their capabilities.

Vendor Selection

Referring to FIG. 2, the web server includes vendor job assignment 300. The function of vendor job assignment 300 is to select the vendor to which the personalized product job order will go. This can be accomplished by several methods. These include, but are not limited to, customer selection and automatic selection.

One way in which a vendor can be chosen is by a software program and the like as is well known in the art. The vendor job assignment 300 can make the decision as to which vendor to select to make the personalized product though a rules based engine. A rules based engine can be designed to chose the vendor based upon price, turnaround time, quality or some other criteria. For example, the vendor job assignment 300 can employ a rules engine employing the following logic: (1) Select lowest cost vendor; (2) Select vendor with highest quality rating; and (3) Select vendor closest to customer location. Alternatively, the vendor job assignment 300 can display to the a customer the various vendors and their capabilities and can select which vendor to use based upon his or her own preferences. As it is apparent, either decision can be based upon a list of the vendor's capabilities.

For example, assume Customer A 11 has personalized a business card. The vendor job assignment 300 determines that business card vendor A, business card vendor B, and business card vendor C can produce the personalized business card. The vendor job assignment 300 also determines that only business card vendor A and business card vendor B have the current inventory (or raw materials) to produce the personalized business card. The vendor job assignment 300 further determines that: business card vendor A can produce 100 personalized business cards for $40 in ten days, whereas business card vendor B can produce 150 personalized business cards for $30 in five days but at a lower quality. At point B in FIG. 2, Customer A 11 can be presented with this data by the vendor job assignment 300, and given the choice between business card vendor A and vendor B, and makes her selection. Alternatively, the vendor job assignment 300 can automatically select the vendor that meets all the requirements for producing the product and is additionally the lowest cost provider.

At this point, point C on FIG. 2, the personalized product file 90 is supplemented with additional data including the choice of vendor selected to produce the personalized product. Additionally, the information regarding all other vendors can be removed from the personalized product file 90. Alternatively, the personalized product database can be supplemented with the additional data of the selected vendor 75.

Batch Grouping

Referring to FIG. 2, the web server includes batch grouping 400. After a vendor is selected for a personalized product job, batch grouping 400 can place together all similar personalized product job orders for that vendor in one large personalized products file. One way to accomplish this is for the batch grouping 400 to retain job orders for a certain window of time (e.g. one hour), and then collecting all similar personalization orders for a vendor together. For example, customer A personalizes a T-shirt with customer A's image on it and submits an order to vendor A. At some point later, customer B personalizes the same type of T-shirt, except with customer B's image on it and submits an order to vendor A, as well. Since the two jobs are of the same T-shirt and require similar personalization, the batch grouping 400 can group the two jobs into one to streamline product costs for the vendor. The web server or a person can determine the similarity of two personalization jobs based upon criteria including, but not limited to, product and manner of personalization and relative closeness in time of job orders. The amount of time to wait before sending off a job to a vendor can be adjusted based upon vendor or customer preferences.

Alternatively, each personalization product order can be processed individually, without use of the batch grouping module 400.

Job Tracking

Referring to FIG. 2, the web server includes job tracking 500. Job tracking 500 generally refers to tracking the progress of a personalized product job request through the manufacturing process. One way to accomplish this is to have the job tracking module 500 attach or tag a unique e-identification code or e-ID to each personalized product file 90. One type of e-ID is a bar-code-type string of numbers and/or letters that uniquely identify a vendor job. They may include a bar coded Order ID, a Group ID, or a Batch ID. The piece tracking IDs are often printed on the physical material that moves through a production process so the production system understands what order it has. Other such tracking identification systems and methods are well known in the art. Additionally, each vendor may have its own unique system for tracking a job, therefore, the job tracking module 500 can be connected to the vendor database 100 to retrieve the specific vendor tracking system to be applied to the personalized product job.

The output of job tracking 500, point E in FIG. 2, is a personalized product file 90 amended with an e-ID. After the personalized product file 90 is tagged with an e-ID, each new component or process that operates or utilizes the personalized product file 90 can update a central processing station or eCare in the website 30 on the website 30. One way job tracking 500 can also be tracked electronically through a workflow engine that will time and date stamp orders and they move through the appropriate work flow process. Alternatively, the job tracking module 500 can enter the job tracking e-ID into the personalized product database.

For example, customer A's personalized business card order is submitted to vendor A as job order A, via the web server. Once the vendor has received job order A, vendor A's computer system will send the eCare database (which can be part of the vendor database or separate) the fact that vendor A has received job order A. The eCare agent or customer can directly check the status of the order. Vendor A can also update the eCare when other events occur including, but not limited to, when job order A has begun, when job order A has been completed and when job order A has been sent off to customer A. Thus, by passing information about where the order is in all phases of the manufacturing process, the central processing station is kept updated on job orders. Therefore, customers can check their order's progress in real-time. Because all orders are sent to the vendor in electronic format ready to be produced with no or very limited manual intervention, the tracking process is also automated with scheduling, production, and shipping information being sent back to the eCare center for customer query of status.

Content Adaptation

Figure 5:
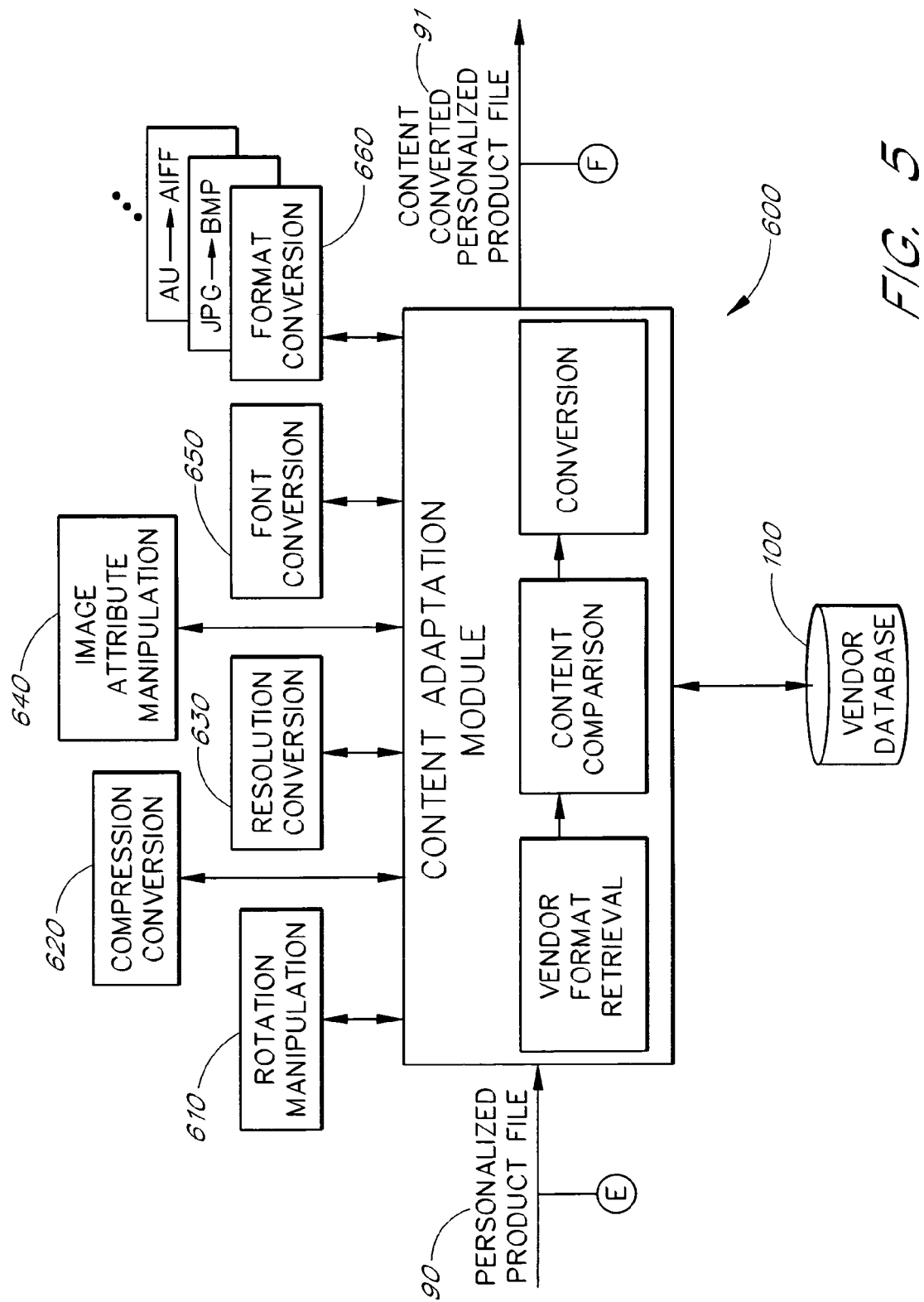
FIG. 5 is a system component diagram depicting the content adaptation architecture and functional operation of the process illustrated in FIG. 2.

Now referring to FIGS. 2 and 5, the web server includes a content adaptation module 600. The content adaptation 600 module generally converts the format of the personalized product, including the personalized content. The input to the contents element adaptation module 600, at point E, is the personalized product file 90 which now includes the name of the vendor who will complete the job and an e-ID. The function of the content adaptation module 600 is to adapt or convert the personalization design, or content, into the format that the vendor chosen to do the job accepts. The personalization design or content generally refers to the personalization that a customer has done to a product.

For example, the personalized product file 90 may contain an image in one format (e.g. JPG) whereas the vendor only accepts pictures in another format (e.g. BMP). Likewise, other formats of the personalized design may have different formats—including, but not limited to, fonts, audio files, video files, compression files, image modes, resolution, and rotations—than the format that the vendor chosen to do the job can accept.

Thus, an adaptation or conversion of the data representing the personalized design or content can be performed by the content adaptation module 600. One way to accomplish the necessary adaptation is for the content adaptation 600 to perform conversions on the content in the personalized product file 90. The personalized product file 90 is an input from point E. The content adaptation module 600 can read the vendor's name from the personalized product file 90 and then retrieve from the vendor database 100, the specific content format in which that vendor accepts data. Next, the content adaptation module 600 compares the content in the personalized product file 90 to the specific content format in which the selected vendor 75 accepts data to determine which formats of the content need to be converted. Then, the content adaptation module 600 accesses a variety of conversion and manipulation units to perform the necessary format conversion on the personalized product file 90. The conversion or manipulation units includes, but is not limited to: a rotation manipulation unit 610, a compression conversion unit 620, a resolution conversion unit 630, an image attribute manipulation unit 640, a font conversion unit 650 and a format conversion unit 660 (which includes, but is not limited to, conversions between different image, audio, and video formats).

Some of the varieties of formats that a design's content can be represented in was mentioned above. The following are examples of other design content formats that may have to be adjusted for a vendor, as is well known in the art: (1) Image Mode—1 bit, Full Color, Monochrome, Spot Color; (2) Compression—JPEG levels (lossy compression), Lossless vs. lossey, TIFF compression types; (3) Resolution—Dots per Inch (DPI); (4) Rotation—image orientation; (5) Image Attributes—white background (determine if the production technique supports a white background or whether white should be converted to transparent), transparency, clipping (know if the production technique will support clipping paths. A clipping path creates the illusion of transparency in an opaque image by masking everything outside of the path, so only the area within the path appears when you print the image or render the image in a production technique). For example, a full color image may need to be converted into a gray level representation of the image; likewise, a high resolution image may need to be down scaled.

One way to do perform these conversions is to use such software as: Bitstream's Web Fonts for font conversions; the Alchemist (Image Alchemy) for conversions between different image graphics formats; Adode PhotoShop for image manipulations; and Iterated for compression conversions.

As pointed out above, the content elements could also consist of audio or other multimedia formats that are used in creating a personalized media product. Furthermore, if the content is already is a form acceptable to the selected vendor, the content adaptation module 600 may forgo conversion or adaptations of the personalized product file 90.

Thus, the output from the content adaptation module 600, at point F, is a content converted personalized product file 91 with corrected content format. Alternatively, the personalized product database could be modified by the content adaptation 600.

Composition and Assembly

Figure 6:
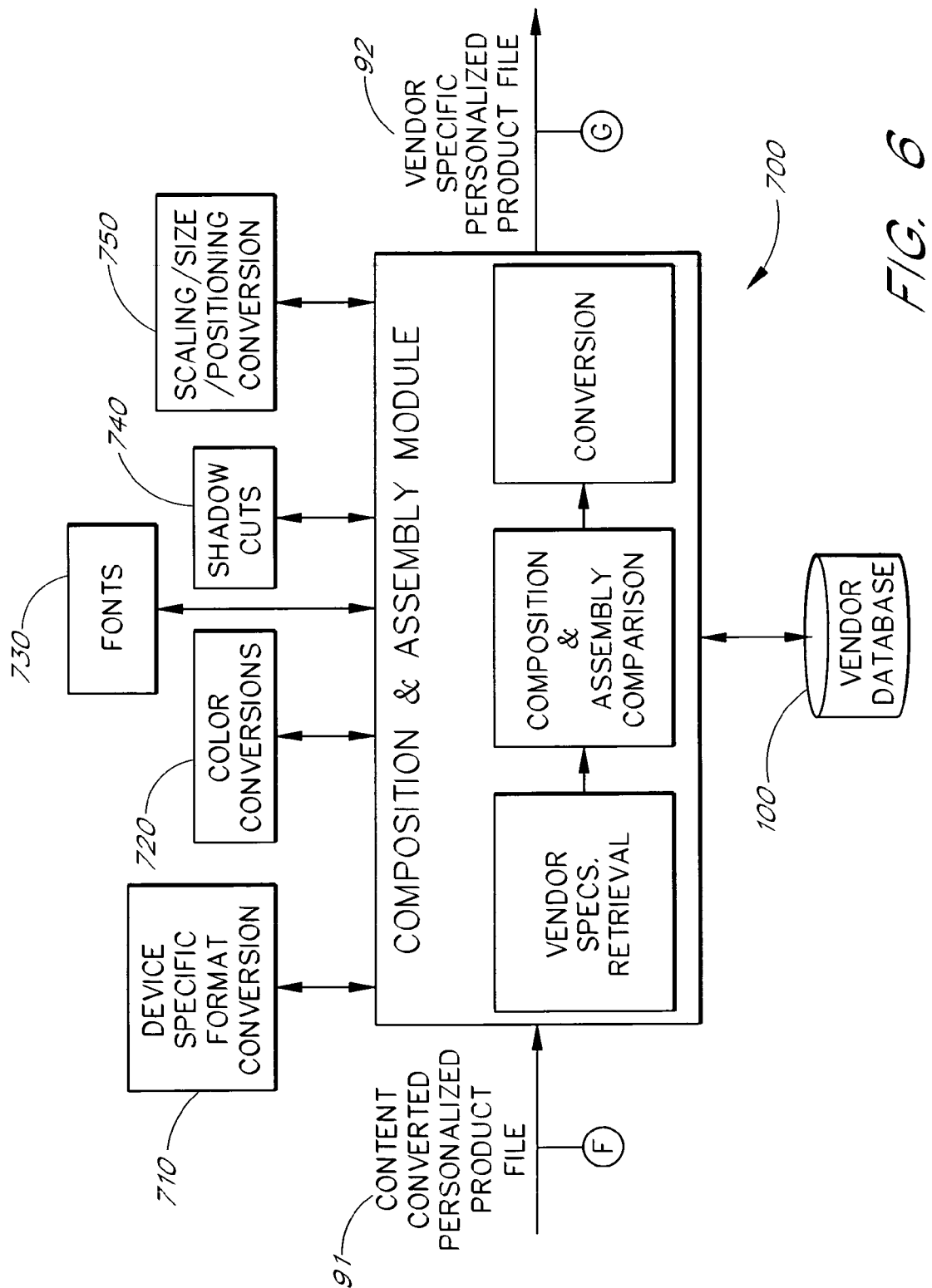
FIG. 6 is a system component diagram depicting the composition and assembly architecture and functional operation of the process illustrated in FIG. 2.

Now referring to FIGS. 2 and 6 the web server includes composition and assembly 700. The composition and assembly module 700 performs the necessary composition and assembly requirements to define the personalized product in the manner in which a vendor defines a personalized product. For example, the content corrected personalized product file 91, may be in the XML format or may be in contained in an Oracle database. However, a vendor may not accept a job order in XML or Oracle database format. Therefore, the description of the entire personalized product needs to be converted or modified by the composition and assembly module 700 according to the specifications of the vendor assigned to product that personalized product. The term "specifications" and "composition and assembly" are used herein to mean the device or process specific format in which a vendor uses to produce, define, or specify a personalized product. For example, composition and assembly can refer to the format in which dimensions, color, sizing, placement (of images or audio files on a product), or any other personalization content which is to appear, be placed, be heard or seen on a product is communicated.

The composition and assembly module 700 creates the necessary device or process specific format based on the personalization order and production technique requirements for the selected vendor 75. For example, the selected vendor 75 may use a specific format for describing where on a product an image is to be placed or where on a product text is to be placed based upon equipment to be used to produce the order. Another example is color specifications; computer monitors define color in Red, Green and Blue (RGB) since in a color cathode ray tube three electron guns direct these three colors of light at the screen in separate beams. However, vendors may require colors defined in CMYK (Cyan, Magenta, Yellow, and blacK), the four standard inks for printing four-color printing requires color separations for each of these standard inks. Another example is found in fonts; some fonts that appear on the computer monitor are not exactly reproducible by a printer and therefore need to be converted into its equivalent printing font. Consequently, the composition and assembly module 700 converts or adapts the personalized product file 90 into the vendor's specific format.

The device or process specific format may include, but is not limited to: (1) color specifications (RGB, B/W, CMYK, etc.); (2) placement specifications; (3) shadow cuts (e.g., a large gray scale image).

Additionally, there are different device specific or process specific formats for different production units. For example, there are several different specific device or process formats for imaging and printing devices. These include, but are not limited to: Postscript (a typesetting/printer language by Adobe), Metacode (a native language of Xerox centralized printing systems), AFP (Advanced Function Presentation, an IBM standard), PCL (Hewlett-Packard Printer Control Language), CIP3, and PPML. Other device specific or process specific formats are used in other media.

Furthermore, the composition and assembly module 700 can provide the necessary imaging to be performed for single page or multiple page products while maintaining numbering sequences and imposition lays. The composition and assembly module 700 may also provide the special trapping or other formatting information for a vendor based on that vendor's specifications for a specific production technique, including, but not limited to: providing the required fonts for the production technique (embedded, linked, referenced, outlined, postscript, or true type); providing the required images for the production technique (resolution, color mode, format); providing the required imposition (positioning of multiple product images onto a press or plate lay to maximize machine throughput); and providing the proper registration, trapping, bleed, knock out considerations in the image.

The personalized design may also require other formatting considerations, such as special trapping, based on vendor attributes and production techniques. For example, the vendor questionnaire presented in table format below, TABLE A1–A7 illustrates many of the vendor attributes and production techniques which need to be addressed:

TABLE 1

Product Information

| Question | Example Answers | Preferred Standard |
|---|---|---|
| What is your tracking identification system? | virtual barcode. | |
| What colors are available for the product? | White. Yellow Pink Blue. | |
| What sizes are available for the product? | Small. Medium. Large. | |

TABLE 2

Fonts

| Possible Vendor Specification | Example Answers | Preferred Standard |
|---|---|---|
| What font formats do you accept? | Type 1. True Type. Multi Master. | Type 1 |
| Minimum size producible | 6 Pt san serif font 8 pt serif font. | |
| Font limitations | Only Helvetica. Any post-script typeface | |
| What sizes are available? | Any. Only 10 pt. | |
| Do you accept embedded, referenced, or outlined fonts? | No. Embedded. | Embedded. |
| Do you accept style modification through the palette? | Yes. No. Just italics. | Yes. |

TABLE 3

Images

| Possible Vendor Specification | Example Answers | Preferred Standard |
|---|---|---|
| What file formats do you accept? | EPS. EPSF. TIFF. WEG. PDF. DCS. | Composite PDF. |
| What Image mode do you accept? | 1-Bit. Monotone. Gray scale. RGB. CMYK. LAB. | All supported by PDF. |
| Resolution range. | 300–600 dpi. | |
| What special image attributes do you accept? | White background. Transparency. Clipping. Rotation. Transformations. | All supported by PDF. |
| Any special compression encoding requirements? | JPEG level 4. Can't do TIFF type 2. Binary, ASCII. Level 1. | All supported by PDF. |

TABLE 4

Production

| Possible Vendor Specification | Example Answers | Preferred Standard |
|---|---|---|
| What is your production process? | Flow chart with technologies indicated. | |
| What color methods do you use? | Process. Spot. RGB. | |
| Generate registration marks? | Registration target. | No. |
| What LPI (Lines Per Inch) values do you support? | 85-133 LPI. | Larger is better |
| What custom screen values do you accept? | None, we override. | All. |
| What are your trapping requirements? | Vendor will trap. Website will trap. | Vendor will trap. |
| What is the resolution of your digital device? | 1200 dpi. 300-by-600 dpi. | |
| What is your imaging technology? | Digital ink jet. Dry toner. Chisel. | |
| What device specific language do you send to your imaging device? | Postscript. PDF. Metacode. AFP. | Postscript of PDF. |
| Minimum forward line weight requirements? | 0.005" | Lower is better. |
| Minimum reverse line weight requirements? | 0.005" | Lower is better. |
| Who does separations? | Vendor. Website. | Vendor. |
| How much bleed is required? | No bleed. 1/16" trim is taken. | |
| Maximum image size? | 4"-by-6" | |
| Any trims required? | Yes - 1/16" | |
| What color Management System do you use? | None. ICC profiles. | ICC. |
| Do you support OPT (Open PrePress Interface) techniques? | No. | OPI. |
| Who compensates for dot gain? | Website. Vendor experiences a 12% gain at 50% | Vendor. |
| What production request format do you use? | PJT. XML. Proprietary. | XML |

TABLE 5

Production - Process Color

| Possible Vendor Specification | Example Answers | Preferred Standard |
|---|---|---|
| What screen angles do you standardize on? | C = 75, M = 85, Y = 105, K = 45. | |

TABLE 6

Production - Spot Color

| Possible Vendor Specification | Example Answers | Preferred Standard |
|---|---|---|
| What are your knock our requirements? | Required. None, we overprint black. | None. |
| What color names do we need to use? | PMS 123. Blue. | PMS. |
| How do you handle images? | We print them as a specified spot color. | |

TABLE 7

Personalize Image

| Possible Vendor Specification | Example Answers | Preferred Standard |
|---|---|---|
| What format? | PDF. Assembly list. XML | Composite PDF or XML Assembly List. |
| Who does assembly? | Vendor. Website. | |

TABLE 8

Impositions

| Possible Vendor Specification | Example Answers | Preferred Standard |
|---|---|---|
| Who does impositions? | Website does it. Vendor does it. | Vendor does it. |

As a further example, there are at least two ways of producing color in offset printing and each requires a specific approach toward trapping:

Spot Color: Trapping spot color is done by setting a slight overprint of one color over the other. A spread is used when a lighter foreground color overprints a darker one at the edges of the lighter color spread into the darker one, and are masked by the knockout in the darker color. The darker color is often called the defining color. A choke occurs when a darker color needs to overprint a lighter color-in this case the lighter background color makes a smaller knockout behind the defining, darker foreground object.

CMYK or Process-color: Process-color printing is when the four ink colors, CMYK are combined to create the impression of a full-spectrum image. Trapping issues with CMYK are in ensuring that the colors contain sufficient percentages of common colors, so that in the case of misregistration there is enough of a common tint created that it will be unnoticeable. This is more important in flat tints than photo-realistic images.

One way the composition and assembly module 700 can modify the personalized product file 90 will now be described. First, the composition and assembly module 700 reads the selected vendor 75 who is to produce the product from the content converted personalized product file 91. Second, the composition and assembly module 700 reads that vendor's specifications from the vendor database 100. Next the composition and assembly module 700 can compare the specifications to the content converted personalized product file 91 to determine how the file, if at all, needs to be modified. Then, the composition and assembly module 700 can perform the necessary conversion or modification by use of various conversion units, including, but not limited to: the device specific format conversion unit 710, the color conversion unit 720, the fonts unit 730, the shadow cuts unit 740, the scaling/sizing/positioning unit 750.

Thus, for example, one vendor may require a PostScript format and another vendor require a metacode format.

The device or process format may also take the form of describing a personalized audio or video media type of product, for example, a clock with a customer's personalized on-the-hour "chimes" or an electronic multimedia greeting with a customers video inserted in appropriate areas.

Thus, the output from the composition and assembly module 700, at point G, is a vendor specific personalized product file 92 with corrected content format and complying with vendor specifications. Alternatively, the personalized product database can be operated on and its contents transformed into defining a personalized product with corrected content format and complying with vendor specifications.

Job Ticket Module

Figure 7:
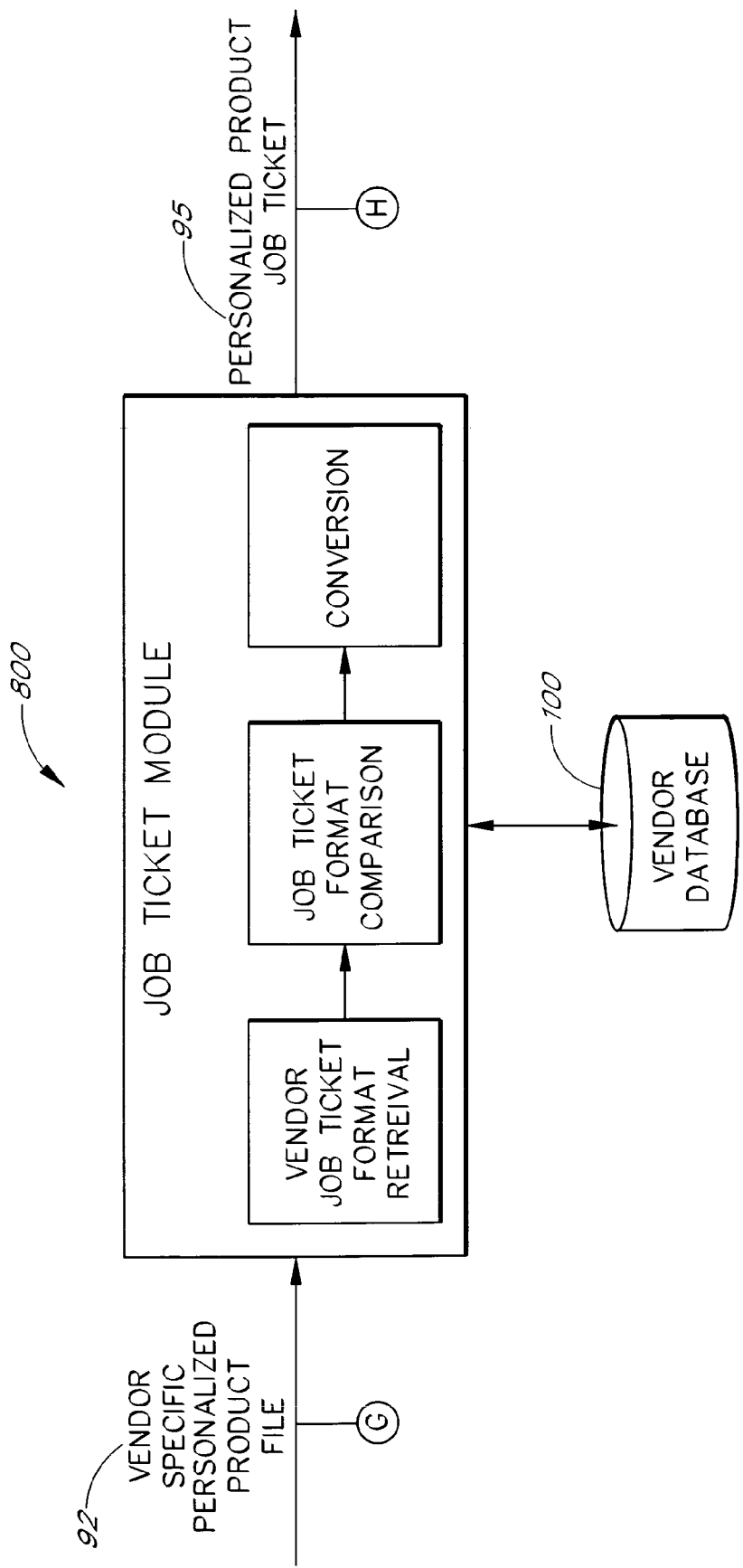
FIG. 7 is a system component diagram depicting the job ticket creation architecture and functional operation of the process illustrated in FIG. 2.

Now referring to FIGS. 2 and 7, the web server includes production request creation. The job ticket module 800 generally creates a production request in the vendor's specific production request format. For example, the personalized product job requested by a customer preferably needs to be in the proper order format that the vendor uses for running jobs in their place of business. Therefore, the vendor specific personalized product file 92 should be modified so that the vendor can not only read the file without having to modify any part of it, but also send the order directly into the vendor's production system. If the job is received by the vendor in the vendor's production request format with the contents of the production request in exactly the format and specifications of the vendor, then the vendor may give the customer or website a cheaper price for the personalized product, there will be quicker production of the item, create more accurate orders and the entire process is streamlined. These are achieved because the vendor does not have to manipulate any part of the production request—all design contents are in the proper format, all specifications are in the vendor's format and the production request is in the vendor's format.

A vendor specific production request format includes the information regarding the production of personalized product. The exact format in which that information is given to the vendor can be different with each vendor. For example, vendor A may require the file to be in a format with the product name first and then the personalized design following, followed by other relevant information. On the other hand, vendor B may require the personalized design to be listed first followed by the product name and then the other relevant information. The other relevant information includes but is not limited to, binding style, ship to addresses, quantity, product color and size. The types of production request formats include, but is not limited to, Portable Job Ticket Format (Adobe) and XML. Portable Job Ticket Format provides a mechanism for specifying the instructions and the location of contents needed to execute a print job. With several vendors, there exists several more permutations and combinations to the production request format. Thus, the job ticket module 700 is able to alter the personalized product file to match the format of the vendor to which the job is going.

One way of accomplishing this is for the job ticket module 800 to compare the vendor specific personalized product file 92 with the production request information for the selected vendor 75 on the vendor database 100. Thus, the job ticket module 800 retrieves the production request format for the specific vendor 75 who was assigned the personalized product job. Next, the job ticket module 800 compares the vendor specific personalized product file 92 with the vendor's production request format to determine what manipulation of the vendor specific personalized product file 92 is appropriate. Then, the job ticket module 800 performs the necessary manipulation of the vendor specific personalized product file 92 to create a production request, such as a personalized product job ticket 95. Thus, a vendor-specific, personalized product job ticket 95 is the output of the job ticket module 800, at point H, and describes the requirements for each personalized job order.

The vendor specific production request can either be send to a vendor via the Internet, email, or on a disk in ground mail. Preferably, the personalized product job ticket 95 is sent directly into the computer system of the selected vendor 75 and production is begun on the personalized product immediately thereafter. Alternatively, the website can place the production requests on the website on a shared database which can be accessed by vendors at any time.

The order fulfillment system 40 will also be able to take a customer supplied personalization list and create the data to produce a number of personalized items (for example personalize party materials). For example, a customer could create personalized party materials such as: place mats with the guests name and a personnel message on the place mat; napkins with the guest's name; mugs with the guest's first name. The customer can design the place mats, napkins, and mugs using the personalization software and generic data names. Customers or a customer can then select a personalization list interface provided by the web server which provides an uploading feature for a list (like an Excel spread sheet or address book file) to provide a personalization list that identifies the guests first names, last names, and personnel messages. A composition engine can merge the variable data from the personalization list into each of the products (place mats, napkins, cup). The order fulfillment system 40 can then process the personalized products and send the order to the vendors.

If there is a need to retain the original personalized product file 90, at point A, that personalized product file 90 could be saved in a database or in any memory storage device. Additionally, each time a new module acts upon or modifies or supplements the personalized product file 90, a new file can be created as is well known in the art. For example, the input at point G to the job ticket module 800 can be called or saved as one file and the output at point H can be called and saved as another file. Preferably, an updateable database can be used for storage of all personalized product order information.

The web server, alternatively, includes a bidding module (not shown) where an interface communicates a personalized product job order to a plurality of vendors. The web server provides an interface that accepts bids from vendors the personalized product order. The interface provided by the web server can either automatically select a vendor based upon a rules engine or communicate the various bids to the customer for her selection of vendor.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above.

Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. Similarly, the various databases and conversion modules, as well as other known equivalents for each such feature, can be mixed and matched by one of ordinary skill in this art to construct order fulfillment systems in accordance with principles of the present invention.

Thus, it is intended that the scope of the present invention herein disclosed should not be limited by the particular disclosed embodiments described above, but should be determined only by a fair reading of the claims that follow.

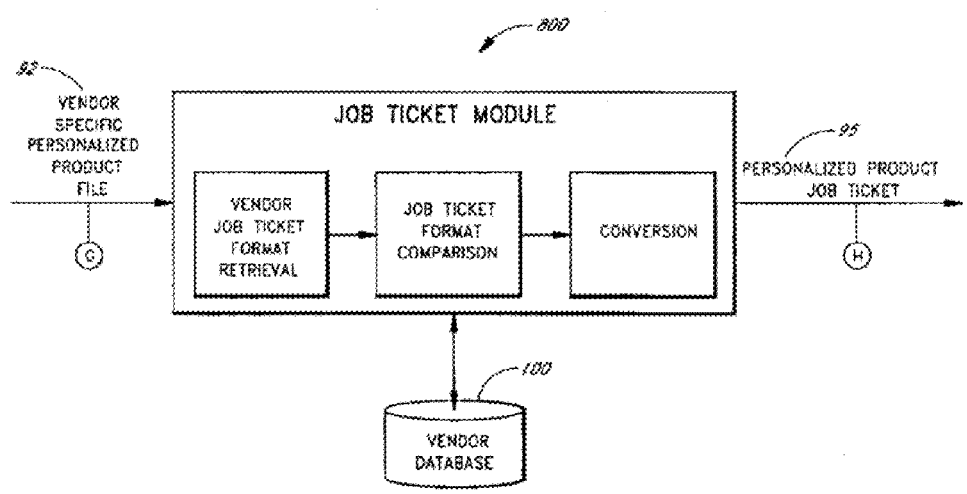

What is claimed is:

1. An internet-based personalized product order system comprising:

a computer configured to communicate with a network;

an acceptance module configured to communicate with the computer, and to accept a personalized product order;

a vendor selection module configured to select a vendor from a plurality of vendors, the selected vendor being capable of producing the personalized product, and each vendor having a preferred personalized product order format, said preferred personalized product order format for each said vendor on file in a vendor database accessible to said computer, each said product order format operative to cause the corresponding vendor's manufacturing facilities to manufacture a personalized product in accordance with the personalized product order;

a conversion module configured to determine the format preferred by the selected vendor based on information in the vendor database pertaining to the selected vendor; and the conversion module configured to convert the personalized product order into the format preferred by the selected vendor, and to send the converted personalized product order to the selected vendor, the converted personalized product order operative to cause the selected vendor's manufacturing facilities to manufacture a desired personalized product in accordance with the personalized product order.

2. The system of claim 1, further comprising a job ticket module configured to create a job ticket for the selected vendor from the file.

3. The system of claim 1, further comprising a personalization module configured to display a personalizable product selected from a plurality of personalizable products, wherein each displayed personalizable product is available for purchase from a plurality of vendors.

4. The system of claim 1, further comprising a sort and batch module configured to group similar orders by vendor into a personalized product order.

5. The system of claim 1, further comprising a vendor database containing vendor pricing information for a plurality of products for a plurality of vendors, wherein the pricing information provided by each vendor for each product is intended for a plurality of customers.

6. A method of producing a personalized product comprising:

accepting a personalized product order from a customer;

selecting a manufacturer capable of producing the personalized product from a plurality of manufacturers, each manufacturer having a preferred personalized product order format, said preferred personalized product order format for each said manufacturer on file in a manufacturer database, each said personalized product order format operative to cause the corresponding manufacturer's manufacturing facilities to manufacture a personalized product in accordance with the personalized product order;

determining the format preferred by the selected manufacturer based on information in the manufacturer database pertaining to the selected manufacturer;

converting the personalized product order into the format preferred by the selected manufacturer; and transmitting the converted personalized product order to the selected manufacturer, the converted personalized product order operative to cause the selected manufacturer's manufacturing facilities to manufacture a desired personalized product in accordance with the personalized product order.

7. A method for receiving and processing orders for personalized products, for use in a system where a user on a user computer provides a request for a personalized product to an order fulfillment system via a communications network, the order fulfillment system including a server in communication with a vendor database containing information pertaining to vendors of products available for personalization, the method comprising:

receiving a request for a product to be personalized;

selecting from the vendor database at least one vendor capable of producing the product;

determining whether the selected at least one vendor can produce the product with the requested personalization based upon the request and information in the vendor database;

determining a production request format preferred by the selected at least one vendor based on the information in the vendor database pertaining to the selected at least one vendor;

creating a production request in the format preferred by the selected at least one vendor; and transmitting the created production request to the selected at least one vendor.

8. The method of claim 7, further comprising grouping related production requests and transmitting them together to a vendor, the created production request operative to cause the selected vendor's manufacturing facilities to manufacture a desired personalized product in accordance with the personalized product order.

9. The method of claim 7, wherein said personalization includes a graphic image incorporated onto the product.

10. The method of claim 7, wherein said request includes an image file in a first format and creating the production request further comprises converting the image file to a second format.

11. The method of claim 7, further comprising transmitting the production request to a single vendor based upon predetermined criteria.

12. The method of claim 11, wherein at least one of the predetermined criteria is included in the request.

13. A method for receiving and processing orders for personalized products comprising:

receiving a request for a product to include a requested personalization via a communications network;

selecting at least one vendor capable of producing the product from a vendor database comprising information pertaining to vendors of products available for personalization;

determining whether the selected at least one vendor can produce the product with the requested personalization based upon the request and information in the vendor database;

determining a production request format preferred by the selected at least one vendor based on the information in the vendor database pertaining to the selected at least one vendor;

creating a production request in the format preferred by the selected at least one vendor; and transmitting the production request to the selected at least one vendor, the transmitted production request operative to cause the selected vendor's manufacturing facilities to manufacture a desired personalized product in accordance with the personalization.

14. The method of claim 13, further comprising grouping related production requests and transmitting them together to a vendor.

15. The method of claim 13, wherein said personalization includes a graphic image incorporated onto the product.

16. The method of claim 13, wherein said request includes an image file in a first format and creating the production request further comprises converting an the image file to a second format.

17. The method of claim 13, further comprising transmitting the production request to a single vendor based upon predetermined criteria.

18. The method of claim 17, wherein at least one of the predetermined criteria is included in the request.

19. A system for receiving and processing orders for personalized products, the system comprising:

a server configured to communicate with a network;

a vendor database configured to communicate with said server, said vendor database comprising product categories and vendor requirements;

a manufacturing analysis module configured to communicate with said vendor database, said manufacturing analysis module configured to receive a request for a product to be personalized, select from the vendor database at least one vendor capable of producing the product, and determine whether the selected at least one vendor can produce the product with the requested personalization based upon the request and information in the vendor database; and a content adaptation module configured to determine a production request format preferred by the selected at least one vendor based on the information in the vendor database pertaining to the selected at least one vendor, and to create a production request in the format preferred by the selected at least one vendor, the production request operative to cause the selected vendor's manufacturing facilities to manufacture a desired personalized product in accordance with the received request.

20. The system of claim 19, further comprising a batch grouping module configured to group related production requests and transmit them together to a vendor.

21. The system of claim 19, further comprising a tracking module configured to track the progress of a product manufactured in response to the production request through a manufacturing process of a vendor.

22. A system for allowing a user to order personalized products, the system accessible to a user on a user computer via a communications network, the system comprising:

a server in communication with a communications network;

a vendor database in communication with said server, said vendor database comprising product categories and vendor requirements;

a manufacturing analysis module operating on said server and configured to communicate with said vendor database, receive a request for a product to be personalized, select from the vendor database a vendor capable of producing the product, and determine whether the selected vendor can produce the product with the requested personalization based upon the request and information in the vendor database; and a content adaptation module configured to determine a production request format preferred by the selected vendor based on the information in the vendor database pertaining to the selected vendor, and to create a production request in the format preferred by the selected vendor, the production request operative to cause the selected vendor's manufacturing facilities to manufacture a desired personalized product in accordance with the received request.

23. The system of claim 22, further comprising a batch grouping module configured to group related production requests and transmit them together to a vendor.

24. The system of claim 22, further comprising a tracking module configured to track the progress of a product manufactured in response to the production request through a manufacturing process of a vendor.

25. The system of claim 22, further comprising a personalization system configured to allow a user to create a request for a product to be personalized.

26. A program storage device storing instructions that when executed by a computer perform the method of producing a personalized product comprising:

accepting a personalized product order from a customer;

selecting a manufacturer capable of producing the personalized product from a plurality of manufacturers, each manufacturer having a preferred personalized product order format;

determining the format preferred by the selected manufacturer based on information in a manufacturer database pertaining to the selected manufacturer, the manufacturer database accessible to the computer;

converting the personalized product order into the format preferred by the selected manufacturer; and transmitting the converted personalized product order to the selected manufacturer, the converted personalized product order operative to cause the selected manufacturer's manufacturing facilities to manufacture a desired personalized product in accordance with the personalized product order.

* * * * *

UNITED STATES PATENT AND TRADEMARK OFFICE
CERTIFICATE OF CORRECTION

| | |
|---|---|
| PATENT NO. | : 7,016,865 B1 |
| APPLICATION NO. | : 09/550010 |
| DATED | : March 21, 2006 |
| INVENTOR(S) | : Weber et al. |

It is certified that error appears in the above-identified patent and that said Letters Patent is hereby corrected as shown below:

The title page should be deleted and substitute therefor the attached title page as shown the attached page On sheet 7 of 7 (FIG. 7), Delete "RETREIVAL" and insert -- RETRIEVAL --, therefor.

At column 10, line 3, after "11" insert -- the --.

At column 10, line 27, delete "customers" and insert -- customer's --, therefor.

At column 15, line 46, delete "Iterated" and insert -- iterated --, therefor.

At column 15, line 60, after "6" insert -- , --.

At column 15, line 66, after "or may be" delete "in contained".

At column 16, line 26, delete "blacK)," and insert -- black), --, therefor.

At column 17 (Table 3), line 49, Delete "WEG." and insert -- JPEG. --, therefor.

At column 18 (Table 4), line 14, after "better" insert -- . --.

At column 18 (Table 4), line 37, Delete "OPT" and insert -- OPI --, therefor.

At column 20, line 12, Delete "preferrably" and insert -- preferably --, therefor.

At column 23, line 34, In Claim 7, delete "vendor." and insert -- vendor, the created production request operative to cause the selected vendor's manufacturing facilities to manufacture a desired personalized product in accordance with the personalized product order. --, therefor.

UNITED STATES PATENT AND TRADEMARK OFFICE
CERTIFICATE OF CORRECTION

PATENT NO. : 7,016,865 B1
APPLICATION NO. : 09/550010
DATED : March 21, 2006
INVENTOR(S) : Weber et al.

It is certified that error appears in the above-identified patent and that said Letters Patent is hereby corrected as shown below:

At column 23, line 37 - 40, In Claim 8, delete "vendor, the created production request operative to cause the selected vendor's manufacturing facilities to manufacture a desired personalized product in accordance with the personalized product order." and insert -- vendor. --, therefor.

At column 24, line 15, In Claim 16, after "an" delete "the".

Signed and Sealed this

First Day of April, 2008

JON W. DUDAS
*Director of the United States Patent and Trademark Office*

(12) United States Patent
Weber et al.

(10) Patent No.: US 7,016,865 B1
(45) Date of Patent: Mar. 21, 2006

(54) PERSONALIZATION FORMAT CONVERTER SYSTEM AND METHOD

(75) Inventors: Richard C. Weber, Stillwater, MN (US); Michael N. Sax, Shoreview, MN (US); Krishna Narayan, Gibsonia, PA (US); Fred H. Squires, Hugo, MN (US)

(73) Assignee: Deluxe Corporation, Shoreview, MN (US)

(*) Notice: Subject to any disclaimer, the term of this patent is extended or adjusted under 35 U.S.C. 154(b) by 0 days.

(21) Appl. No.: 09/550,010

(22) Filed: Apr. 14, 2000

(51) Int. Cl.
G06F 17/60 (2006.01)

(52) U.S. Cl. .................................. 705/26

(58) Field of Classification Search ............ 705/26, 705/27; 700/95, 96, 115
See application file for complete search history.

(56) References Cited

U.S. PATENT DOCUMENTS

| | | | |
|---|---|---|---|
| 4,799,156 A | 1/1989 | Shavit et al. | 705/26 |
| 4,887,207 A | 12/1989 | Natarajan | 705/10 |
| 4,992,940 A | 2/1991 | Dworkin | 705/26 |
| 5,029,099 A | 7/1991 | Goodman | 700/233 |
| 5,053,956 A | 10/1991 | Donald et al. | 713/601 |
| 5,099,422 A | 3/1992 | Foresman et al. | 705/3 |
| 5,111,392 A | 5/1992 | Malin | 705/29 |
| 5,117,354 A * | 5/1992 | Long et al. | 705/27 |
| 5,168,445 A | 12/1992 | Kawashima et al. | 705/10 |
| 5,287,267 A | 2/1994 | Jayaraman et al. | 705/10 |
| 5,307,261 A | 4/1994 | Maki et al. | 705/29 |
| 5,311,424 A | 5/1994 | Mukherjee et al. | 705/29 |
| 5,339,252 A * | 8/1994 | White et al. | 700/98 |
| 5,347,306 A | 9/1994 | Nitta | 348/14.1 |
| 5,357,439 A * | 10/1994 | Matsuzaki et al. | 700/96 |
| 5,440,479 A | 8/1995 | Hutton | 705/26 |
| 5,480,317 A | 9/1995 | Lu et al. | 705/10 |
| 5,459,656 A | 10/1995 | Fields et al. | 705/7 |
| 5,491,743 A | 2/1996 | Shiio et al. | 709/204 |
| 5,513,117 A | 4/1996 | Small | 700/233 |
| 5,544,062 A | 8/1996 | Johnston, Jr. | 700/117 |
| 5,550,746 A | 8/1996 | Jacobs | 700/231 |
| 5,552,994 A | 9/1996 | Cannon et al. | 700/95 |
| 5,557,780 A | 9/1996 | Edwards et al. | 703/27 |
| 5,570,231 A * | 11/1996 | Sudou et al. | 700/95 |
| 5,592,511 A | 1/1997 | Schoen et al. | 375/220 |
| 5,615,123 A | 3/1997 | Davidson et al. | 700/233 |

(Continued)

FOREIGN PATENT DOCUMENTS

WO    WO-99/35551 A2 *  7/1999

OTHER PUBLICATIONS

Anon., "MAXIS: 'SimCity' Company Releases New Gift Making Software; Innovative Gift Maker Lets Users Design and Order Presents Using PCs," Business Wire, Nov. 3, 1994.*

(Continued)

Primary Examiner—Nicholas D. Rosen
(74) Attorney, Agent, or Firm—Knobbe Martens Olson & Bear LLP

(57) ABSTRACT

A system and method for conveying information about a personalized product are disclosed. A web server processes product personalization information for a vendor. The web server accepts the personalization that a customer has provided and performed on a product. The web server further accepts a submission from the customer for an order for the production of that personalized product. The web server determines the vendors capable of producing the personalized product and may accept either customer selection of a vendor or automatic selection of a vendor to produce the personalized item. The web server can describe the personalized product in a manner consistent with a data specification or a production request format as defined by the vendor.

26 Claims, 7 Drawing Sheets